United States Patent [19]

Delio

[11] Patent Number: 4,848,129
[45] Date of Patent: Jul. 18, 1989

[54] METHOD FOR MAKING SUBSTANTIALLY FORGED ARTICLES SUCH AS TANK TREAD CONNECTORS

[76] Inventor: Ralph D. Delio, R.D. #1 Susan Trace, New Wilmington, Pa. 16142

[21] Appl. No.: 64,320

[22] Filed: Jun. 18, 1987

[51] Int. Cl.$^4$ .................. B21D 22/00; B21D 31/00
[52] U.S. Cl. ................................ 72/374; 72/356; 72/357; 72/377
[58] Field of Search ............. 72/354, 356, 357, 358, 72/359, 377, 472, 372, 374

[56] References Cited

U.S. PATENT DOCUMENTS

| 94,630 | 9/1869 | Morse | 72/472 |
|---|---|---|---|
| 3,340,717 | 9/1967 | Körner et al. | 72/367 |
| 3,889,512 | 6/1975 | Delio | 72/377 |
| 4,294,101 | 10/1981 | Diemer et al. | 72/356 |
| 4,599,804 | 12/1985 | Delio et al. | 72/356 |

FOREIGN PATENT DOCUMENTS 852431  8/1981  U.S.S.R. .................. 72/377

Primary Examiner—E. Michael Combs
Attorney, Agent, or Firm—Fay, Sharpe, Beall, Fagan, Minnich & McKee

[57] ABSTRACT

A billet (10) is pressed with a first blocking punch (36, 38). Thereafter, the billet is rotated approximately 90°. A second punch (50) is pressed against the billet while a split ring die assembly (58) substantially surrounds the billet and constrains outward flow of the steel. The split ring die assembly includes projecting regions (64, 66) matingly received in recesses (14, 16) created by the first blocking punch. A finishing punch (90, 92) is pressed through the billet to complete formation of openings (94, 96). Preferably, a trimmer (100) removes any flashing from the finished billet.

4 Claims, 4 Drawing Sheets

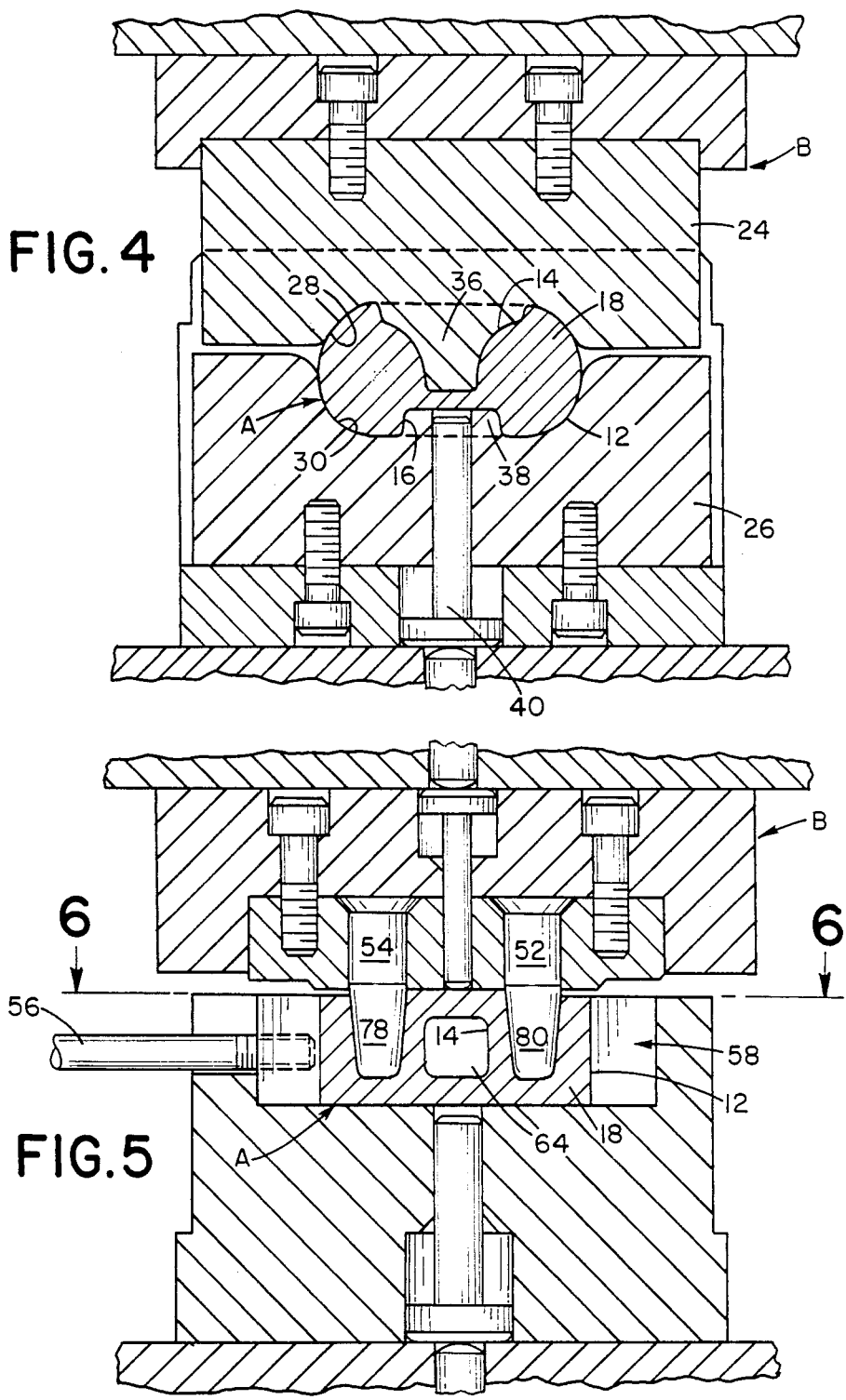

4,848,129

METHOD FOR MAKING SUBSTANTIALLY FORGED ARTICLES SUCH AS TANK TREAD CONNECTORS

BACKGROUND OF THE INVENTION

This invention pertains to the art of forming metal articles. The invention is particularly applicable in forging tank tread connectors which have generally perpendicular forged passages. It is to be appreciated, however, that the invention has broader applications in forming other metal articles that encounter these same difficulties in manufacturing.

Conventional methods of forging articles such as tank tread connectors have been unable to forge the openings required for pin connections between associated connectors. Previously, articles of this type were forged to form opening or passages in but one direction. Thereafter, expensive and time-consuming cold machining was required to remove the material to create perpendicular and intersecting openings. This problem was magnified due to the large number of connectors that may be formed under such a conventional method.

Examples of articles and forming articles of this type are shown in U.S. Pat. Nos. 4,294,101 issued Oct. 13, 1981 to Diemer, et al.; 4,425,779 issued Jan. 17, 1984 to Diemer, et al.; 4,463,637 issued Aug. 7, 1984 to Delio, et al.; and 4,559,804 issued Dec. 24, 1985 to Delio, et al. None of these patents shows minimizing the final machining by pressing a billet along perpendicular directions to substantially form perpendicular openings.

Still other disadvantages result from machining away the excess steel from the prior art rough forgings. Cold working of the metal does not enhance or facilitate the strength of the final formed part. The metal hardening inherent in forging operations is absent in other methods of manufacturing the articles. Therefore, if more of each article could be forged, not only are there resultant savings in time and expense but, the forged article has improved strength characteristics.

The present invention contemplates both a method and apparatus for making substantially forged articles that overcome the above-referenced problems and others.

SUMMARY OF THE INVENTION

In accordance with the present invention, there is provided a method of forming a substantially forged article. The billet is pressed in a first die stroke so that it assumes a predetermined configuration. The billet is then rotated approximately 90° and pressed again in a second die stroke. Thereafter, a finishing punch is pressed through the billet.

According to a preferred method, a pair of split ring die halves are provided which substantially surround the billet in the second die stroke operation. The split ring die halves are formed with associated protrusions and recesses for mating receipt with the first die stroke configuration of the billet. Thereafter, the billet is trimmed, preferably simultaneously with the finishing punch pressing step. In a subsequent machining operation, a second opening is completed through the recess formed.

In accordance with another aspect of the invention, an apparatus is provided for substantially forging an article. First and second coacting die assemblies define die cavities in which a billet is pressed into a first configuration. A split ring die has recesses and protrusions which matingly receive the first configuration billet after it is rotated 90°. A blocking punch is disposed perpendicular to the split ring die for displacing the billet. A finishing punch assembly presses through the billet.

A primary advantage of the present invention is that the article can be heat treated and then machined.

Another advantage of the present invention resides in the substantial cost savings resulting from forging the article substantially to size.

Still another advantage is found in the stronger article that results from grain flow around the forged openings.

Yet another advantage is realized in the saving of steel since the article is closer to completion once it leaves the die assembly.

Still other advantages and benefits of the invention will become apparent to those skilled in the art upon a reading and understanding of the following detailed description.

BRIEF DESCRIPTION OF THE DRAWINGS

The invention may take form in certain parts and arrangements of parts or various steps and arrangements of steps. The specification and accompanying drawings are only for purposes of describing a preferred embodiment and are not to be construed as limiting the invention.

FIG. 4 is a sectional view through a die assembly and billet generally illustrating the initial forging steps of the present invention;

FIG. 5 is a sectional view after the billet forged in the die of FIG. 4 has been rotated through approximately 90° and received within a split ring cavity;

DETAILED DESCRIPTION OF THE PREFERRED EMBODIMENT AND METHOD

Figure 1:
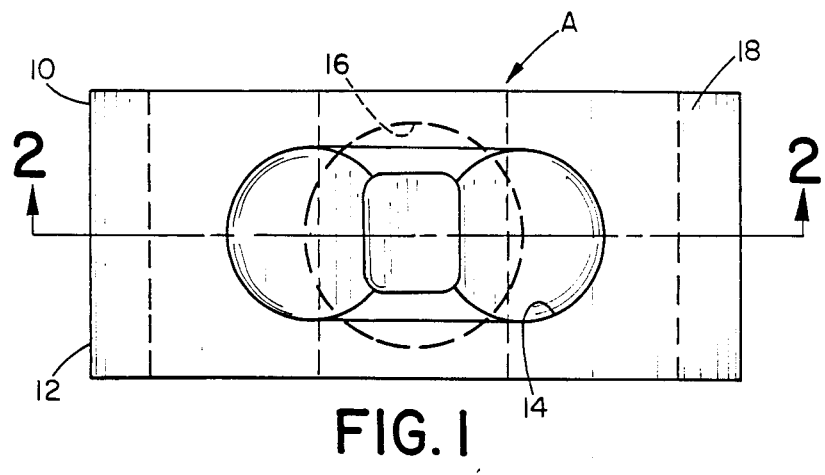
FIG. 1 is a top view of an article formed in accordance with the present invention.

The FIGURES show a substantially forged article A that undergoes a series of pressing steps in a die assembly B. The forged article illustrated in FIGS. 1 and 2 results in a substantial cost savings over articles made in a conventional manner which require more extensive machining. The forged article A is illustrated as a tank tread connector, although it will be understood by those of ordinary skill in the art that still other articles embracing the general principles and concepts of this forged article may be made in a similar manner.

With particular reference to FIG. 4, a billet 10 is pressed in a first blocking assembly to assume a generally oval peripheral configuration 12. In the initial blocking step, a first set of oppositely disposed recesses 14, 16 are formed in the billet while it is still hot and susceptible to forging operations. The first blocking die assembly includes a first or upper die 24 and a second or lower die 26. Typically, the lower die is stationary and the upper die 24 securely mounted to a ram (not shown) for relative movement toward and away from the lower die. The upper die includes a generally arcuate or concave cavity 28 that substantially matingly receives the billet 10. Likewise, the lower die includes a generally arcuate or concave cavity 30 that faces the upper die cavity and also matingly receives the billet. An upper blocking punch 36 extends downward from the upper die into the cavities 28 and 30. Likewise, a lower blocking punch 38 extends upward from the lower die and into the die cavity 30.

The billet is positioned between the upper and lower dies and, while still hot, the upper die is moved relative to the lower die and the blocking punches form the associated recesses 14, 16 in the billet. The blocking punches 36, 38 extend substantially, but not completely, through the billet along a first plane or axis. It is particularly noted that this blocking punch pressing operation does not form a flashing that often results from similar pressing operations. Instead the arcuate cavities of the dies provide a smooth outer surface to the billet. The upper die is then moved away from the lower die and an ejector 40, typically fluid pressure actuated, assists in removal of the billet from the cavities. The billet now has a first predetermined configuration resulting from the first blocking punch pressing operation; namely, a generally elliptical peripheral surface with the oppositely disposed recesses 14, 16 between generally planar, parallel front and rear faces.

Figure 6:
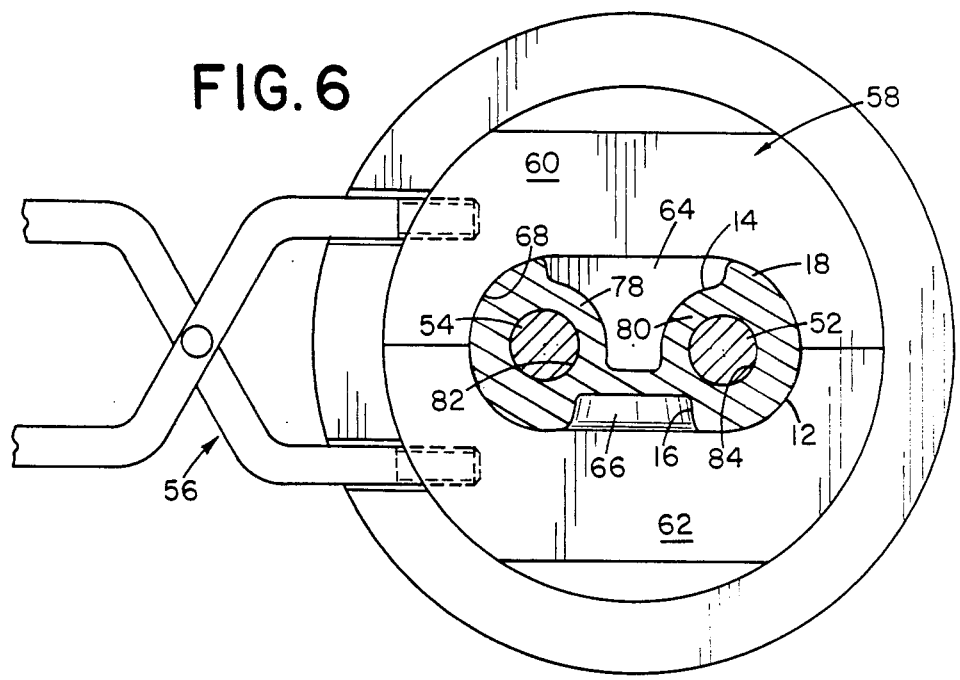
FIG. 6 is a sectional view generally along the lines 6—6 of FIG. 5 and particularly illustrating tongs and split ring assembly.

Turning now to FIGS. 5 and 6, the billet 10 has been rotated through approximately 90° relative to its position in FIG. 4. The die assembly now includes a second blocking punch 50 comprised of first and second generally frusto-conical punch members 52, 54. Once again, the blocking punches are dimensioned to extend substantially through the billet along a second plane or axis perpendicular to that of the first die operation plane or axis. It is preferable that the blocking punches not extend completely through the billet. A tong assembly 56 is operatively connected to a split ring die assembly 58. The split ring die assembly includes first and second half portions 60, 62 that completely encompass the billet. More particularly, the half portion 60 includes a projection 64 having the general configuration of blocking punch 36 which generally fills recess 14. Similarly, a projection 66 of the other half portion 62 has a configuration that closely resembles that of blocking punch 38 and generally fills recess 16. The remainder of a cavity 68 defined by the split ring die assembly closely receives the generally elliptical peripheral billet surface for reasons which will become more apparent below.

As illustrated in FIGS. 5 and 6, the punch members 52, 54 are pressed into engagement with the billet along a generally perpendicular to a common central axis of recesses 14, 16. The punch members are positioned close to the recess 14 but sufficiently spaced therefrom so as not to intersect therewith. Preferably interconnecting portions or webs 78, 80 are defined between recesses or cavities 82, 84 formed by the punch members 52, 54 and the recesses 14, 16. As particularly shown in FIGS. 2 and 3, these interconnecting webs are removed by machining after the forging operation in order to interconnect recess 14 with the cavities 82, 84.

Figure 7:
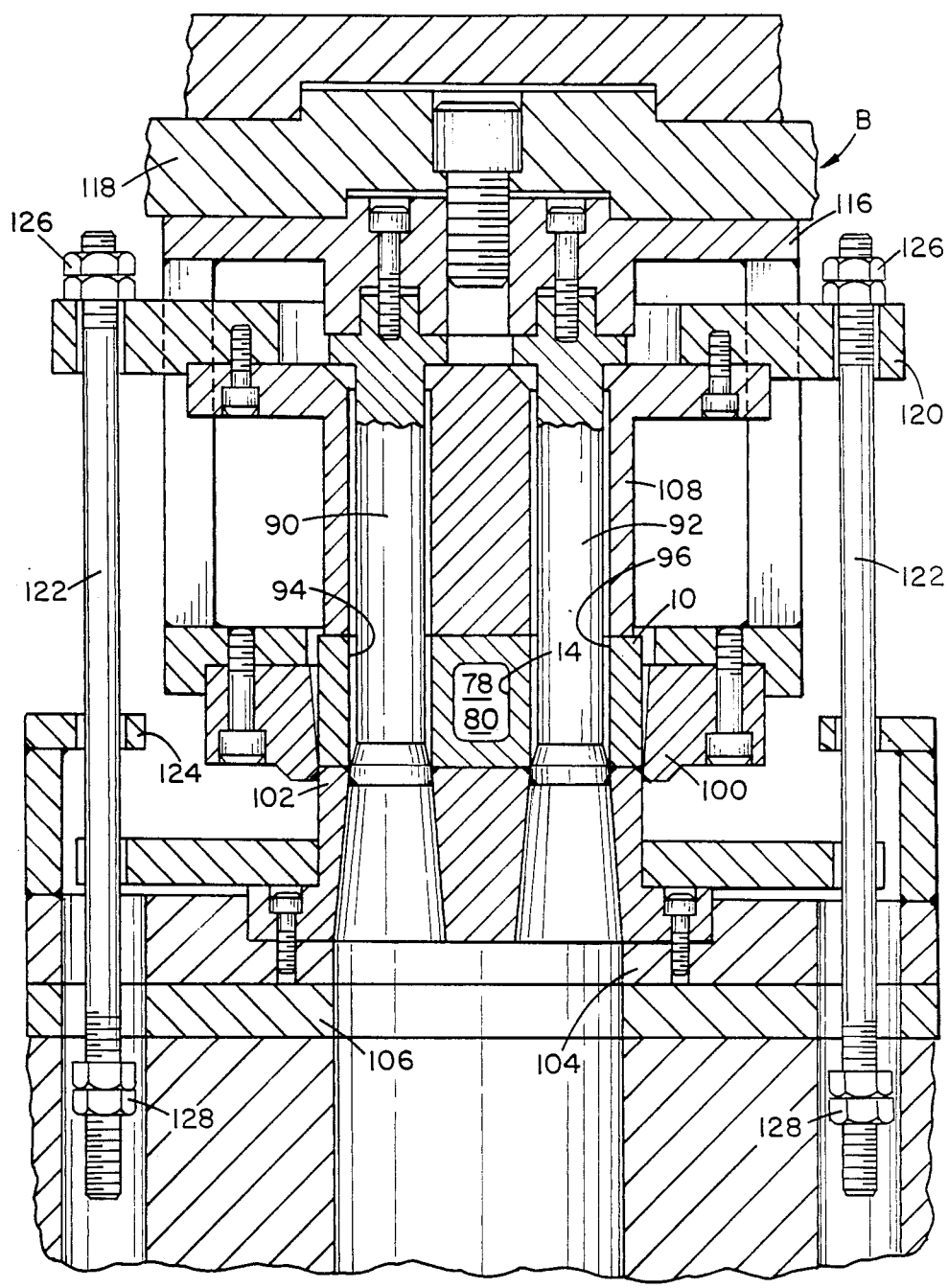
FIG. 7 is a sectional view through the die assembly particularly illustrating the finishing and trimming steps of the subject invention.

With reference now to FIG. 7, a pair of finishing punches 90, 92 are aligned with the cavities 82, 84. The punches are pressed downward through the remainder of the billet 18 to enlarge the cavities 82, 84 into openings 94, 96. It is these cylindrical openings which are separated from the recesses 14, 16 and later interconnected when the webs 78, 80 are removed through a machining operation.

With continuing reference to FIG. 7, lower end portions of the finishing punches 90, 92 each have a stellite peripheral edge to facilitate formation of the openings 94, 96. Likewise, a surrounding trimmer 100 has an inner peripheral stellite cutting edge to remove any flashing along the outer periphery of the forged billet. Preferably, the trimmer and finishing punches are simultaneously moved downward relative to the billet to remove any exterior flashing that is formed during the second blocking die operation.

In the trimmer and finishing punches described above, the billet 10 is seated on a nest 102 which, in turn, is received in a nest holder 104 on die set shoe 106. The punches extend through a forging stripper 108 and move axially relative thereto during reciprocating motion of the ram (not shown). The upper trimmers and punches are fixed to a drum 116 which is secured to a die set punch holder 118. Lastly, a banjo 120 is fastened to the forging stripper 108 to assist in removal of the punches from the billet.

In operation, the billet is removed from the die assembly after the second die stroke shown in FIG. 5. The billet is disposed on the nest as shown in FIG. 7 and the punch and trimmer advanced downward to remove the flashing and form the openings 94, 96. The return or upward stroke of the punches would lift the billet off the nest if a means for separating the billet from the punches were not provided. According to the preferred embodiment, elongated rods 122 extend from the banjo and engage a stop 124 to limit the upward movement of the billet. More specifically, the banjo engages nuts 126 at the upper end of the rod and nuts 128 at the lower end engage stop 124. The banjo is prevented from further upward movement which is transferred to the forging stripper 108. The forging stripper, in turn, limits upward movement of the billet. The punches continue moving upward relative to the billet to complete the third die stroke operation.

Referring again to FIG. 3, a fastening member 132 has a wedge-shaped portion 134 at one end and a threaded region 136 at the other end. Once the machining steps that remove the interconnecting webs have been completed, the wedge-shaped portion 134 is matingly received in the recess 14 that has been enlarged by machining. The threaded region cooperates with a nut 138 in the recess 16 which has been trued by machining to facilitate connection of the tank tread connector 18. Since the connection of the tank tread connectors is generally conventional and forms no part of the subject invention, no further discussion is deemed necessary.

As referenced above, prior art methods of forming the openings 94, 96 resorted to machining after the forging operation. This, of course, resulted in considerable expense and machining time whereas the subject invention provides a forged billet after the finish punch arrangement that is substantially complete.

Figure 8:
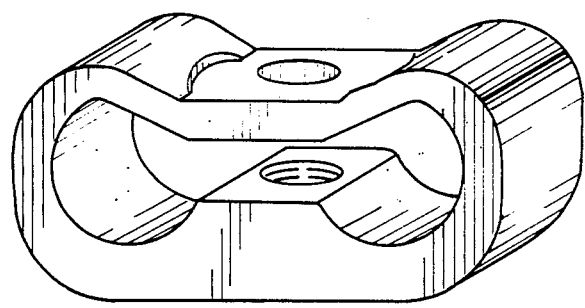
FIG. 8 is a perspective view of an alternative embodiment of the subject invention.

FIG. 8 illustrates an alternative embodiment in which the second punch 50 is formed as an elongated unitary member having a generally FIG. 8 cross-sectional configuration. A unitary punch rather than the separate punches previously described eliminates even more machining. In substantially all other respects, the generally forged billet A' undergoes the same steps as described above.

Figure 2:
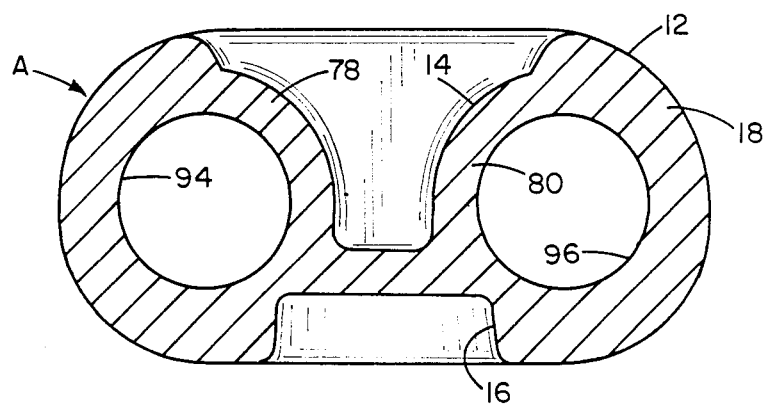
FIG. 2 is a cross-sectional view generally along the lines 2—2 of FIG. 1.
Figure 3:
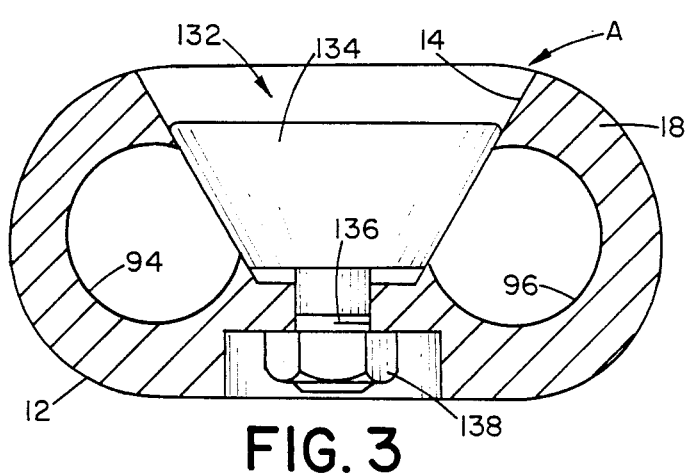
FIG. 3 is a partial cross-sectional view also generally along the lines 2—2 of FIG. 1 after additional machining steps and insertion of a wedge-shaped fastener.
Figure 9:
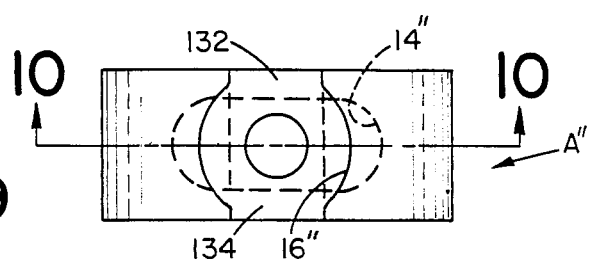
FIG. 9 is a top view of yet another alternate embodiment of the subject invention; and, FIG. 10 is a cross-sectional view generally along the lines 10—10 of FIG. 9.
Figure 10:
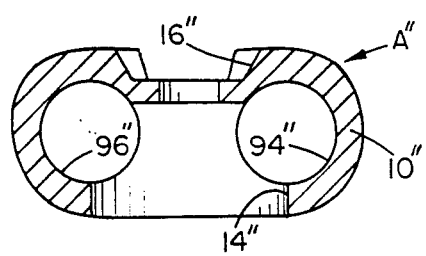

Turning now to the alternate embodiment of FIGS. 9 and 10, the forged article A" differs from the embodiment of FIGS. 1–3 in the formation of recess 16". As best shown in FIG. 9, opposite end regions 132, 134 open the recess 16" to the peripheral edge of the connector. These cutout regions 132, 134 permit and facilitate access with a wrench or other tool into the recess 16".

The invention has been described with reference to the preferred embodiment. Obviously, modifications or alterations will occur to others upon a reading and understanding of the specification. It is intended to include all such modifications and alterations insofar as they come within the scope of the appended claims or the equivalents thereof.

Having thus described the preferred embodiments, the invention is now claimed to be:

1. A method for forming a tank tread connector, comprising the steps of:
   pressing a billet with a first blocking punch without extending completely through said billet such that the billet generally conforms to a generally oval configuration with a first recess;
   rotating said billet approximately 90°;
   pressing said billet with a second blocking punch without extending completely through said billet such that a second recess is defined generally perpendicular to the first recess;
   pressing a finishing punch completely through the second recess to form a first opening through the billet and, machining the billet to interconnect the first recess formed by the first blocking punch with the first opening formed by the finishing punch pressing step.

2. The method of forming a tank tread connector as defined in claim 1 comprising the further step of trimming the billet generally simultaneously with the finishing punch pressing step.

3. The method of forming a tank tread connector as defined in claim 1 comprising the further step of machining the billet adjacent the first recess formed by the first blocking punch pressing step to form a second opening through said billet generally perpendicular to the first opening.

4. The method of forming a tank tread connector as defined in claim 7 comprising the further step of encompassing the billet with a split ring assembly where said split ring assembly generally conforms to the generally oval configuration and includes a protrusion for receipt in the first recess.

* * * * *